United States Patent [19]
Klappert et al.

[11] Patent Number: 5,602,815
[45] Date of Patent: Feb. 11, 1997

[54] METHOD AND APPARATUS FOR COMBINING CD-ROM DATA AND DIGITAL AUDIO ON A SINGLE DISC

[75] Inventors: Walter R. Klappert, Topanga, Calif.; Robert T. Seidel, West Pittston, Pa.

[73] Assignee: WEA Manufacturing, Inc., Del.

[21] Appl. No.: 287,770

[22] Filed: Aug. 9, 1994

[51] Int. Cl.$^6$ ............................................. G11B 5/09
[52] U.S. Cl. ............................ 364/59; 369/54; 360/48
[58] Field of Search ............................ 369/275.3, 59, 369/32, 47–48, 54, 58, 60, 124; 360/48–49, 40, 51, 72.02, 19.1

[56] References Cited

U.S. PATENT DOCUMENTS

| | | | |
|---|---|---|---|
| 5,313,443 | 5/1994 | Iitsuka | 369/50 |
| 5,363,362 | 11/1994 | Maeda et al. | 369/54 |
| 5,377,178 | 12/1994 | Saito et al. | 369/124 |
| 5,414,686 | 5/1995 | Iitsuka | 369/48 |

FOREIGN PATENT DOCUMENTS

| | | |
|---|---|---|
| 0165320 | 11/1984 | European Pat. Off. . |
| 0259666 | 8/1987 | European Pat. Off. . |
| 0260845 | 9/1987 | European Pat. Off. . |
| 0289914 | 4/1988 | European Pat. Off. . |
| 0326437 | 1/1989 | European Pat. Off. . |
| 2196506 | 9/1987 | United Kingdom . |
| WO93/01593 | 6/1992 | WIPO . |

*Primary Examiner*—Ali Neyzari
*Attorney, Agent, or Firm*—Blakely Sokoloff Taylor & Zafman

[57] ABSTRACT

A method for combining CD-ROM and CD-DA audio data on a single compact disc to reduce the amount of noise which is heard when the compact disc is played back on a player which is not specially adapted to play compact discs with both CD-ROM and CD-DA audio data. Presently, there are three (3) methodologies embodying the invention. In the first, the CD-ROM, i.e., CD-ROM boot blocks are placed in Track 1, Index 1; the CD-DA audio tracks are placed in tracks (2, 3, ..., N) and the CD-ROM data files are placed in track (N+1). In the second, the entire CD-ROM Volume is placed in Track 1, Index 0; the first CD-DA audio track is placed in Track 1, Index 1, and all other CD-DA audio tracks are placed in tracks 2, 3, ..., N. In the third, the entire CD-ROM Volume is placed in Track 1, Index 0 as in the second. However, in the third, the boot blocks for the CD-ROM volume are repeated in Track 1, Index 1, with all CD-DA audio selections being placed in tracks 2, 3, ..., N.

18 Claims, 3 Drawing Sheets

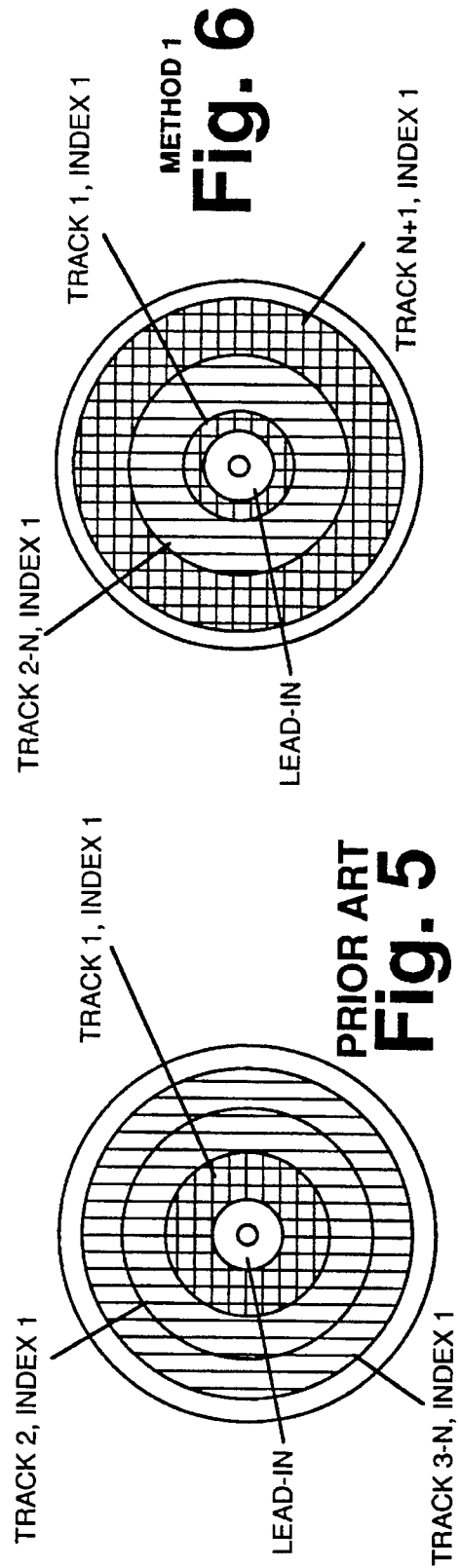
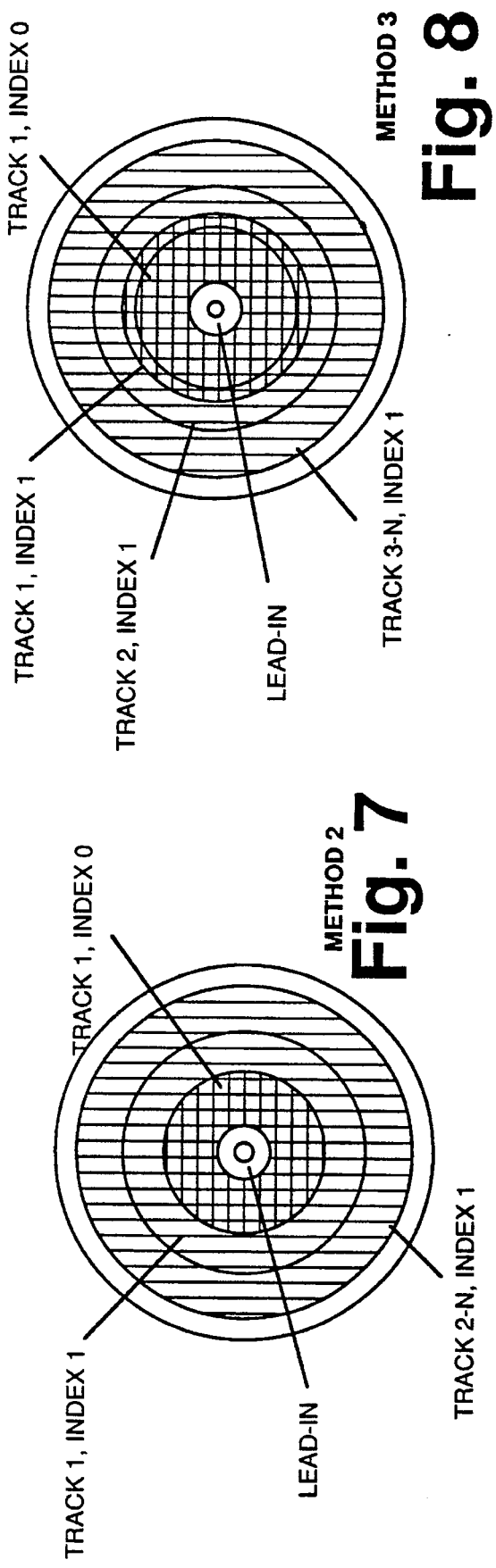

METHOD AND APPARATUS FOR COMBINING CD-ROM DATA AND DIGITAL AUDIO ON A SINGLE DISC

BACKGROUND OF THE INVENTION

The current commercial specifications for digital audio, compact discs ("CD-DA") i.e., the format for storing and playing high fidelity audio tracks, and compact disc-read only memory ("CD-ROM"), i.e., the format for storing and retrieving data intended to be accessed by general purpose personal computers, have been co-developed by Philips N.V. and Sony Corporation. These specifications are commonly referred to as the Red Book (for compact disc digital audio) and the Yellow Book (for CD-ROM) each of which is a technical specification created by Philips N.V. and Sony Corporation entitled "Compact Disc Digital Audio System Description" and "Compact Disc-Read Only Memory System Description," respectively. A commercial specification for CD-DA is also published by the international Electrotechnical Commission, entitled IEC Publication 908 "Compact disc digital audio system."

In addition to the information structure and layout for CD-ROM, the CD-ROM outlines the specification for placing CD-DA audio tracks on a CD-ROM disc. This specification is commonly called the Multimode format. See FIGS. 1 and 5.

However, for reasons discussed below, the Multimode format has not been fully accepted by the audio industry as a suitable distribution medium for audio compact discs that also contain CD-ROM material. With this in mind, a set of special methodologies have been developed which define alternate methods for placing CD-ROM and CD-DA audio tracks on the same disc. These methodologies are referred to herein as the invented Multimode methodologies.

The Multimode format is not fully accepted by the audio industry for the following reasons:

(a) According to the Multimode format, the CD-ROM volume must be placed in Track 1, Index 1 while the CD-DA audio selections are placed in tracks 2, 3, ..., N as shown in FIG. 1. For this case, Track 1, Index 0 must be 2 seconds long and usually consists of block structured CD-ROM Mode 1 data with the user data field set to 2048 bytes of binary zeroes. (On a pure CD-DA disc, Track 1, Index 0 is 2–3 seconds long and contains digital silence.) Standard compact disc audio players will attempt to "play" the CD-ROM information in Track 1, Index 1. Therefore, unless notified to use the "NEXT TRACK" entry on the player's control panel or remote, the end-user will experience a very long pause before the first CD-DA audio track is heard. The length of this pause will be equal to the "real-time" length of the CD-ROM track.

(b) In relation to the problem listed in (a), a few first generation compact disc audio players do not possess the control circuitry required to detect and then mute CD-ROM tracks. In these instances, the compact disc audio player attempts to convert the CD-ROM information into an analog signal. The resulting signal is passed through the speaker system as full volume static. This can be very damaging to the speakers as well as to the listener's hearing.

DESCRIPTION OF THE DRAWINGS

FIG. 5 shows another view of the layout of FIG. 1.

FIG. 6 shows another view of the layout of FIG. 2.

FIG. 7 shows another view of the layout of FIG. 3.

FIG. 8 shows another view of the layout of FIG. 4.

SUMMARY OF THE INVENTION

While the standard Multimode format is based on the placement of CD-DA audio tracks on a CD-ROM disc, the invented Multimode methodologies focus on the placement of a special CD-ROM area on a CD-DA audio disc. The major difference between the standard Multimode format and the invented Multimode methodologies is the emphasis placed on consumer platforms. The standard Multimode format places more emphasis on the CD-ROM consumer platform; while the invented Multimode methodologies place more emphasis on the audio compact disc consumer platform.

The invented Multimode methodologies can be used for the distribution of audio compact discs that also contain a special CD-ROM area that can store text, graphics, animations, video, or interactive program material. Although the primary target for audio compact discs that also contain a special CD-ROM area is the compact disc audio market, most consumers who possess the appropriate CD-ROM hardware and software can access the special information area on the disc.

Presently, there are three (3) methodologies embodying the invention. Each methodology utilizes a different method for placing a CD-ROM information area on a CD-DA audio disc.

DETAILED DESCRIPTION OF THE INVENTION

Methodology #1: CD-ROM DATA FILES—LAST TRACK

Figure 1:
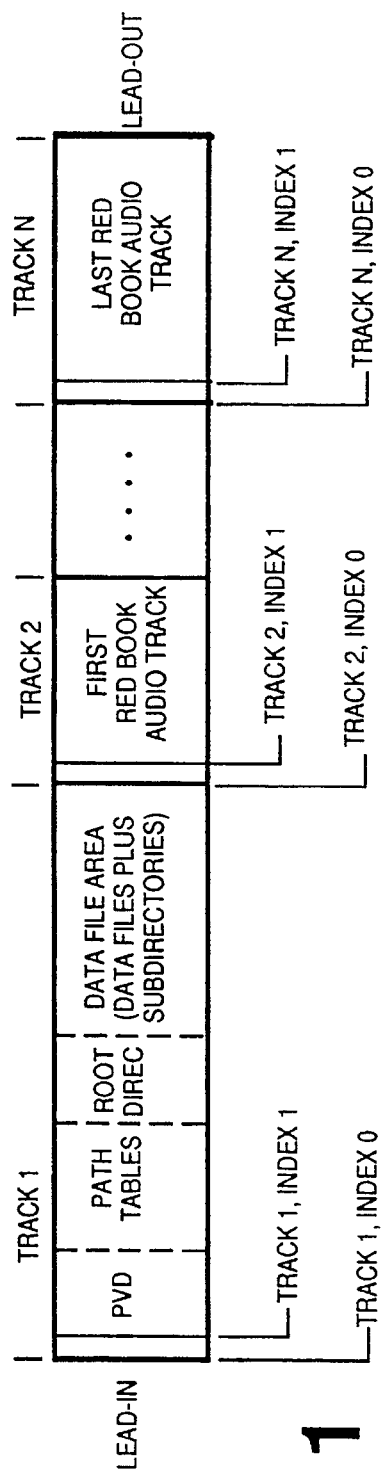
FIG. 1 shows the layout of a prior art Multimode format compact disc.
Figure 2:
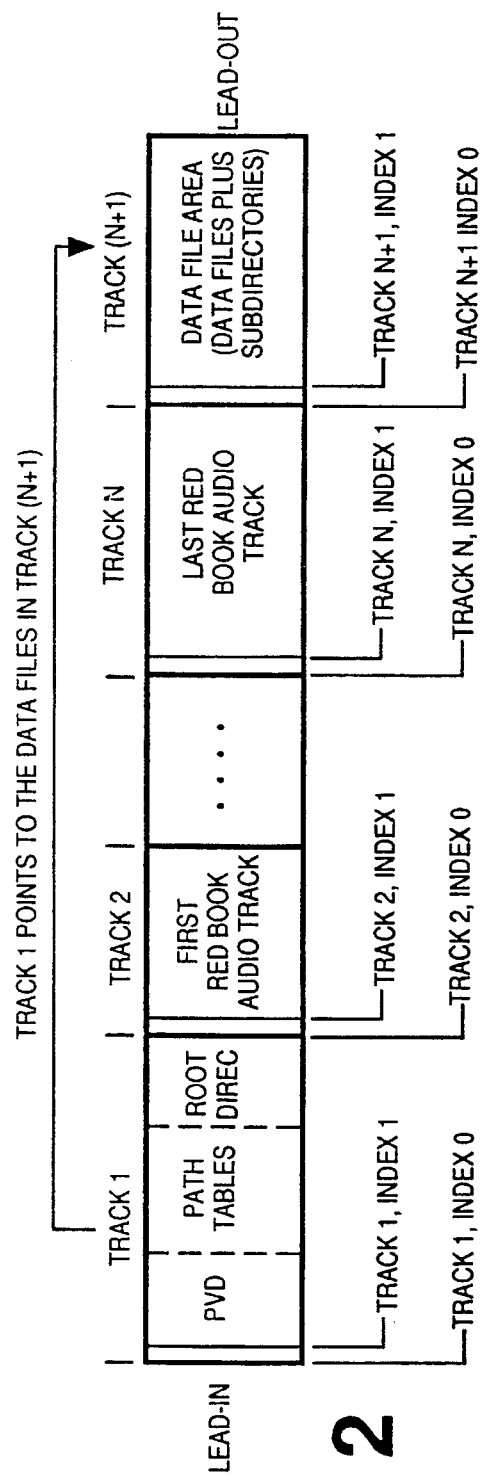
FIG. 2 shows the layout of a Multimode format compact disc according to methodology #1 of the present invention.

In methodology #1 as shown in FIGS. 2 and 6, the CD-ROM boot blocks are placed in Track 1, Index 1. The CD-DA audio tracks are placed in tracks (2, 3, ..., N). The CD-ROM data files are placed in track (N+1).

The volume and file structure of the CD-ROM portion of the disc uses an industry standard known as ISO9660. Track 1, Index 1 of the disc contains the boot block composed of the primary volume descriptors (PVD), root directory, and path tables for the entire CD-ROM volume and other volume specific identifiers as needed according to ISO9660. Therefore, Track 1 is very short (usually <4 seconds, including PostGap. A PostGap is an area added to the end of a data track that is followed by another type of track; such as an audio track. If the format for the data track is CD-ROM Mode 1, the PostGap should also be CD-ROM Mode 1 format with the user data field set to 2048 bytes of binary zeroes.

The root directory and path tables of Track 1, Index 1 point to the data files of the volume. These data files are contained in the last track of the disc (after all CD-DA audio tracks).

Before creation of the ISO9660 volume, an absolute starting location for the placement of the data files is calculated by adding the following track and index lengths:

```
Track 1, Index 0 length - Rom (must be 00:02:00 mm:ss:ff)
+Track 1, Index 1 length - Rom (usually 00:04:00 mm:ss:ff)
+Track 2, Index 0 length - AUD (usually 00:02:00 mm:ss:ff)
+Track 2, Index 1 length - AUD (first CD-DA audio)
+Track 3, Index 0 length - AUD (usually 00:02:00 mm:ss:ff)
+Track 3, Index 1 length - AUD (second CD-DA audio)
  •       •       •       •        .
+Track N, Index 0 length - AUD (usually 00:02:00 mm:ss:ff)
+Track N, Index 1 length - AUD (last CD-DA audio)
+Track (N+1), Index 0 - AUD/ROM (usually 00:03:00
mm:ss:ff)
=Absolute starting location for the placement of data files
expressed as mm:ss:ff
(where ROM represents the length in mm:ss:ff of a CD-ROM
selection and AUD represents the length in mm:ss:ff of a
CD-DA audio selection).
```

The Track (N+1), Index 0 or Pre-gap selection should consist of two parts, Pre-gap 1 and Pre-gap 2. Pre-gap 1 should be at least 1 second long and consist of digital silence. Pre-gap 2 should be at least 2 seconds long and consist of block structured CD-ROM Mode 1 data with user data fields set equal to binary zeroes.

This absolute time can be translated into a logical sector number (LSN), by the following equation:

$$LSN=\{[(mm*60)+ss]*75+ff\}-150.$$

This absolute location is equivalent to the sum of the lengths of all previous pauses (Index 0) and tracks (including PostGap). During the ISO9660 formatting process, the data files are arranged in the volume starting at the precalculated absolute location. The resulting ISO9660 volume contains a large gap (i.e., "dead" space containing no useful information) between the boot blocks and the data file area. The ISO9660 volume is then partitioned into two files; one containing the boot blocks (usually blocks 0–150) and one containing the data file area, starting with the first block of the first file and ending with the last block of the last file in the data file area.

During the disc formatting process, the boot blocks (e.g., boot block file) for the ISO9660 volume are placed in Track 1, Index 1. Track 1, Index 0 must be 2 seconds long (same as required by the current commercial CD-ROM specifications) and usually consists of block structured CD-ROM Mode 1 data with the user data field set to 2048 bytes of binary zeroes.

The CD-DA audio tracks are placed in tracks 2, 3, . . . N. Track 2 begins with a minimum pause (Track 2, Index 0) of 2 seconds containing digital silence.

The data file area (previously stored as a separate file) is placed at the precalculated location with track number N+1. The header field found in each of the data file sectors must be generated to correspond to the Logical Sector Number (LSN) stored in the root directory and path tables of the volume without any tolerance. For example, for LSN=4500, the header field must equal 01:02:00 mm:ss:ff since one second corresponds to 75 sectors and 4500/75 equals 60 seconds plus the 2 seconds for Track 1, Index 0. In addition, the header field should coincide with the corresponding absolute disc time (stored in the Q-channel of the disc); such that the disc "skew" is equal to 0.

The ISO9660 Volume/File Specification and the installed base of CD-ROM device drivers require that the boot blocks be placed at the beginning of a CD-ROM disc. However, discs conforming to this first methodology possess a very short track 1 (usually less than 4 seconds). Therefore, the audio discrepancies listed above are minimized at the beginning of the disc.

The largest portion of the CD-ROM volume is placed at the end of the disc. Therefore, CD audio players will experience those same audio discrepancies listed above at the end of this disc. However, these discrepancies can be suppressed with proper product documentation or by including a verbal warning statement at the end of the last audio track (e.g., WARNING: THE FOLLOWING INFORMATION TRACK CONTAINS CD-ROM INFORMATION. IT IS RECOMMENDED THAT . . . ).

Due to the location of the data files in relation to the root directory/path tables (e.g., beginning of disc) and the physical dimensions of the disc (RPMs decrease as the playback head moves radically outward on the disc), average access time of the program material is higher than normal.

For the first methodology, the ISO9660 volume must be created with premastering software that allows the user to control the physical placement of the data files within the volume. The disc formatting process can be accomplished by transferring the boot block file, all CD-DA audio tracks, and finally the data area file to consecutive files on standard 8 mm Exabyte tape. The disc layout can be generated using premastering software that supports DDP (Disc Description Protocol—ANSI Z39.72-199X). Various commercially available premastering products include the tools necessary to perform this type of disc formatting.

Methodology #2: CD-ROM VOLUME—TRACK 1, INDEX 0

Figure 3:
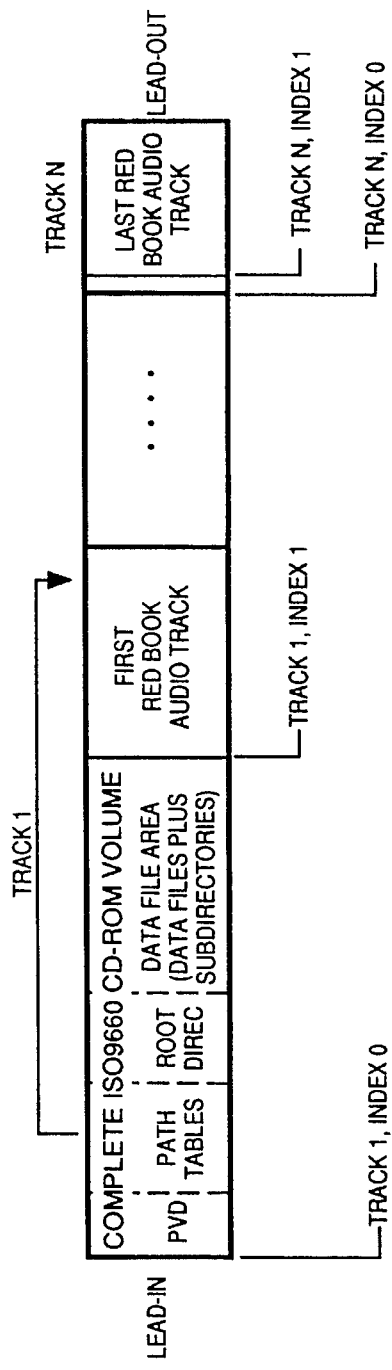
FIG. 3 shows the layout of a Multimode format compact disc according to methodology #2 of the present invention.

In methodology #2 as shown in FIGS. 3 and 7, the entire CD-ROM Volume is placed in Track 1, Index 0. The first CD-DA audio track is placed in Track 1, Index 1. All other CD-DA audio tracks are placed in tracks 2, 3, . . . , N.

The volume and file structure is ISO9660 in Track 1, Index 0. In other words, Track 1, Index 0 of the disc contains the entire CD-ROM volume; including primary volume descriptors (PVD), root directory, path tables, and the data file area.

During the disc formatting process, the CD-ROM volume is positioned in Track 1, Index 0 according to the ISO9660 descriptor location requirements. For example, the primary volume descriptor is placed at LSN 16 (Logical Sector Number 16) with a Sector header time of 00:02:16 (mm:ss:ff). This usually requires a 2 second offset (150 empty CD-ROM Mode 1 sectors starting at an absolute disc time of 00:00:00 mm:ss:ff) placed before the CD-ROM volume.

The absolute disc time (stored in the Q-channel of the disc) should coincide with the time stored in the sector header such that the resulting disc skew is 0.

The first CD-DA audio track is place in Track 1, Index 1 (following a longer than normal Track 1, Index 0 which contains the CD-ROM information area). All other CD-DA audio tracks follow in tracks 2, 3, . . . , N.

Most CD audio players are configured to directly access Track 1, Index 1 upon disc insertion and selection of the "PLAY" control option (unless a special track is selected or preprogrammed). Therefore, the CD-ROM information area will be skipped over during normal audio access on most CD players. Methodology #2 avoids the audio discrepancies described before for CD audio players which are so configured.

However, for systems that are not configured in this manner and begin at Track 1, Index 0, the audio discrepancies listed above would be heard.

The CD-ROM information area is fully accessible on CD-ROM configurations that access the ISO9660 volume via absolute time (e.g. independent of track and index points). It is believed that the majority of CD-ROM configurations (more specifically CD-ROM device drivers) are configured to directly access the PVD at LSN 16 (e.g., Sector header time of 00:02:16 mm:ss:ff) via absolute disc time. Once the PVD is found, the addresses for the root directory and path tables for the volume can be located (also via absolute disc time).

For the second methodology, the disc formatting process can be accomplished by transferring the entire ISO9660 volume to the first file on an 8 mm Exabyte tape. All CD-DA audio tracks can then be stored on the 8 mm Exabyte tape in the order in which they should appear on the final compact disc. The disc layout can be generated using premastering software that supports DDP (Disc Description Protocol—ANSI Z39.72-199X). Various commercially available premastering products include the tools necessary to perform this type of disc formatting.

Methodology #3: REPEAT "BOOT BLOCK"—TRACK 1, INDEX 1

Figure 4:
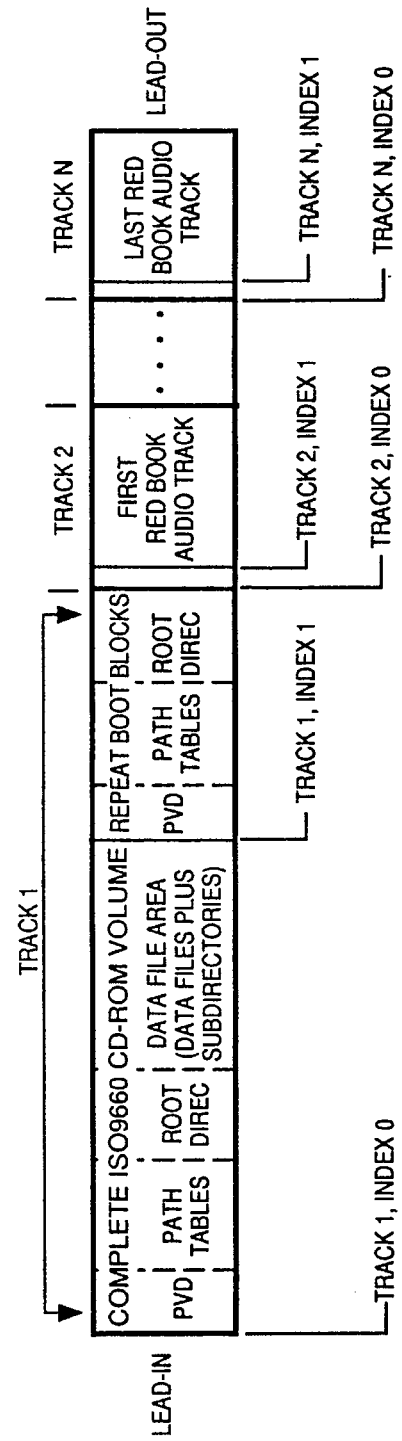
FIG. 4 shows the layout of a Multimode format compact disc according to methodology #3 of the present invention.

Methodology #3 as shown in FIGS. 4 and 8 is very similar to methodology #2 in that the entire CD-ROM Volume is placed in Track 1, Index 0. However, methodology #3 specifies the boot blocks for the CD-ROM volume are repeated in Track 1, Index 1, with all CD-DA audio selections being placed in tracks 2, 3, . . . , N.

The volume and file structure is ISO9660. Track 1, Index 0 of the disc contains the entire CD-ROM volume, including primary volume descriptors (PVD), root directory, path tables, and data file area. Track 1, Index 1 of the disc contains the identical boot blocks for the CD-ROM volume, including the PVD, root directory, and path tables.

During the disc formatting process, the CD-ROM volume is positioned in Track 1, Index 0 according to the ISO9660 descriptor location requirements. For example, the primary volume descriptor is placed at LSN 16 (Logical Sector Number 16) with a Sector HEADER time of 00:02:16 (mm:ss:ff). This usually requires a 2 second offset (150 empty CD-ROM Mode 1 sectors starting at absolute disc time=00:00:00 mm:ss:ff) placed before the CD-ROM volume.

In addition, an exact copy of the boot blocks is repeated in Track 1, Index 1. The resulting disc contains a very short Track 1, Index 1 (usually<4 seconds, including PostGap). Since the boot blocks are an exact copy of those found in Track 1, Index 0, the root directory and path tables for both volumes point to the same absolute locations in the data file area. Therefore, CD-ROM device drivers configured to access the boot blocks in Track 1, Index 1 will still be able to access the CD-ROM information area.

For Track 1, Index 0, the absolute disc time (stored in the Q-channel of the disc) should coincide with the time stored in the sector header such that the resulting disc skew is 0.

CD-DA audio selections are placed in tracks 2, 3, . . . , N. Track 2 will begin with a minimum pause (Track 2, Index 0) of 2 seconds containing digital silence.

ISO9660 specifies that the location of the primary volume descriptor (PVD) must be LSN 16 (Logical Sector Number 16). The PVD contains the location of the root directory and path tables. Once the PVD is found, the root directory and path tables are loaded into RAM of the computer system to which the CD-ROM drive is connected and normal volume interaction usually proceeds.

However, CD-ROM device drivers vary in their method of accessing the PVD of the ISO9660 volume. Repeating the boot blocks in Track 1, Index 1 increases the number of compliant CD-ROM configurations (or CD-ROM device drivers) since most drivers which do not access the PVD at LSN 16 do access the PVD in Track 1, Index 1.

Methodology #3 offers a tradeoff, an increased end-user CD-ROM compliance for a reduction of CD-DA audio playback integrity. Discs conforming to methodology #3 possess a very short Track 1, Index 1 (usually less than 4 seconds). Therefore, the audio discrepancies listed above will be present, but in a shortened version as compared with methodology #2.

For the third methodology, the disc formatting process can be accomplished by transferring the entire ISO9660 volume to the first file on an 8 mm Exabyte tape. An exact copy of the boot blocks (e.g., boot block file) should be transferred to the 8 mm Exabyte tape as the second file. The CD-DA audio tracks should then be transferred to the 8 mm Exabyte tape in the order in which they should appear on the final compact disc. The disc layout can be generated using premastering software that supports DDP (Disc Description Protocol—ANSI Z39,72 199X). Various commercially available premastering products include the tools necessary to perform this type of disc formatting.

The following section discusses techniques for dealing with problems which may be encountered when utilizing the various methodologies described namely, CD-ROM noise shaping and recommendations for technically supporting these formats.

CD-ROM NOISE SHAPING

As discussed above, the standard Multimode disc format includes CD-ROM data in Track 1, Index 1. A few first generation CD audio players do not possess the control circuitry required to detect and then mute CD-ROM tracks. In these instances, the CD audio player attempts to convert the CD-ROM information into an analog signal. The resulting signal is passed through the speaker system as full volume static. This can be very damaging to the speakers as well as the listener.

Two of the invented Multimode methodologies require very short CD-ROM data areas (containing the boot blocks) in Track 1, Index 1. First generation CD audio players will experience the same problem (described above) with discs utilizing these methodologies (specifically with respect to methodologies #1 and #3). Although the extent of this discrepancy is minimized (from the entire length of the CD-ROM volume to about 4 seconds), there is still the possibility of passing full volume static through the speaker system.

These undesired effects could be further minimized with the use of CD-ROM noise shaping techniques. If used properly, the full volume static could be reduced to a series of "ticks". The information contributing to the "ticks" are the SYNC, HEADER, EDC, ECC, and any other "mandatory" information found in the sectors of the "boot block" area (such as volume descriptors, path tables, root directory, etc.).

This type of noise shaping is achieved by replacing the "don't care" information (e.g., all 2048 user data sectors that are not required by the ISO9660 volume; such as sectors 0–15, the 150 sectors of PostGap, and all other sectors between the PVD, Root Directory, Path Tables, etc.) in the boot blocks with a special pattern of data. This pattern of data is identical to the output of the scramble register (a register that is required during the standard CD-ROM scrambling process which is performed on all data within a sector except the synchronization field or first 12 bytes of a sector). The scramble register is a 15 bit shift register fed back according to the polynomial $x^{15}+x+1$ and preset with the binary value 0000 0000 0000 001. During the standard CD-ROM scrambling process, the content of each CD-ROM sector (serial out—LSB first) is EXOR-ed with the output of the scramble register. (Note: the scramble register and EXOR gate is a standard CD-ROM encoding technique described in the current commercial CD-ROM specifications and must be performed during the processing of CD-ROM information for compatible decoding during playback on conventional CD-ROM players). If the majority of the "Boot Block" data consists of the same pattern of data that is found in the scramble register, the majority of the output data from the EXOR gate will be zero (since anything EXOR-ed with itself is zero). The only output data from the EXOR gate that will not equal zero will be the "mandatory" information.

The output of the EXOR gate consists of the scrambled data which is placed on the CD. However, this "noise shaped" scrambled pattern of data largely consists of digital silence. When this part of the disc is accessed by a CD audio player without the previously discussed control circuitry for CD-ROM detection and muting, the scrambled information is not de-scrambled, but grouped into audio samples and reconstructed back into an analog signal. The noise shaped analog signal results in an audible series of "ticks", rather than full volume static.

The invented Multimode methodologies are solutions for placing CD-ROM program material on CD-DA audio discs. With this in mind, it should be noted that there is not an ideal method of storing CD-ROM and CD-DA audio tracks on the same disc. No matter which format or application is used, including the standard Multimode format, a percentage of consumers will experience system or player incompatibilities.

For this reason, the following technical support steps may be employed by the application distributor.

Place a set of CD-ROM device driver on a BBS (Bulletin Board System) and distribute the BBS number with the CD product documentation. The set of CD-ROM device driver should be designed to conform with the chosen methodology and most ISO9660 CD-ROM configurations (including the Microsoft CD Extensions, various adapter cards and CD-ROM drives). Consumers that experience difficulties accessing the CD-ROM program area and have access to a modem can retrieve and use the driver for this hardware.

Audio discrepancies can be minimized with adequate product labeling. Consumer "awareness" can be increased with WARNING and/or CAUTION labels placed on the disc print, jewel case, packaging, etc.

A reserve of CD-ROM discs, fully compliant with current commercial CD-ROM specifications, could be manufactured and distributed to consumers who are experiencing incompatibility problems with the CD-ROM portion of the disc. In addition, CD-DA discs fully compliant with current commercial CD-DA specifications, except without the CD-ROM information area, can be utilized for similar distribution.

Although the foregoing description has been set forth with reference to ISO9660 compliant compact discs, depending on the driver for a specific system, the methodologies should work for other formats such as HFS as defined by Apple Computer, Inc.

We claim:

1. A method for combining CD-DA audio data and CD-ROM digital data on a single compact disc comprising the steps of:

a) placing CD-ROM digital data boot blocks beginning at Track 1, Index 1 of the compact disc;

b) placing a first CD-DA audio data selection beginning at Track 2, Index 1 and placing N–2 subsequent CD-DA audio data selections at Track 3, Index 1 through Track N, Index 1 of the compact disc respectively;

c) placing CD-ROM digital in a data file area corresponding to said CD-ROM digital data boot blocks beginning at Track N+1, Index 1 of the compact disc.

2. A method for combining CD-DA audio data and CD-ROM digital data on a single compact disc comprising the steps of:

a) placing CD-ROM digital data boot blocks and CD-ROM digital in a data file area corresponding to said CD-ROM digital data boot blocks beginning at Track 1, Index 0 of the compact disc;

b) placing a first CD-DA audio data selection beginning at Track 1, Index 1 and placing N–1 subsequent CD-DA audio data selections at Track 2, Index 1 through Track N, Index 1 of the compact disc respectively.

3. A method for combining CD-DA audio data and CD-ROM digital data on a single compact disc comprising the steps of:

a) placing CD-ROM digital data boot blocks and CD-ROM digital in a data file area corresponding to said CD-ROM digital data boot blocks beginning at Track 1, Index 0 of the compact disc;

b) placing a copy of the CD-ROM digital data boot blocks beginning at Track 1, Index 1 of the compact disc;

c) placing a first CD-DA audio data selection beginning at Track 2, Index 1 and placing N–2 subsequent CD-DA audio data selections at Track 3, Index 1 through Track N, Index 1 of the compact disc respectively.

4. A compact disc adapted to contain both CD-DA audio data and CD-ROM digital data comprising:

a) CD-ROM digital data boot blocks beginning at Track 1, Index 1 of the compact disc;

b) a first CD-DA audio data selection beginning at Track 2, Index 1 and N–2 subsequent CD-DA audio data selections at Track 3, Index 1 through Track N, Index 1 of the compact disc respectively;

c) CD-ROM digital in a data file area corresponding to said CD-ROM digital data boot blocks beginning at Track N+1, Index 1 of the compact disc.

5. A compact disc adapted to contain both CD-DA audio data and CD-ROM digital data comprising:

a) CD-ROM digital data boot blocks and CD-ROM digital in a data file area corresponding to said CD-ROM digital data boot blocks beginning at Track 1, Index 0 of the compact disc;

b) a first CD-DA audio data selection beginning at Track 1, Index 1 and N–1 subsequent CD-DA audio data selections at Track 2, Index 1 through Track N, Index 1 of the compact disc respectively.

6. A compact disc adapted to contain both CD-DA audio data and CD-ROM digital data comprising:

a) CD-ROM digital data boot blocks and CD-ROM digital in a data file area corresponding to said CD-ROM digital data boot blocks beginning at Track 1, Index 0 of the compact disc;

b) a copy of the CD-ROM digital data boot blocks beginning at Track 1, Index 1 of the compact disc;

c) a first CD-DA audio data selection beginning at Track 2, Index 1 and N–2 subsequent CD-DA audio data selections at Track 3, Index 1 through Track N, Index 1 of the compact disc respectively.

7. The method defined by claim 1 further comprising the step of replacing user data sectors within said CD-ROM digital data boot blocks with a predetermined pattern of data which, when played backed, is digital silence.

8. The method defined by claim 7 wherein said predetermined pattern of data is obtained by applying an exclusive OR operation involving each byte or each CD-ROM sector and an output of a scramble register and using the result to replace certain data in said CD-ROM sectors.

9. The method defined by claim 2 further comprising the step of replacing user data sectors within said CD-ROM digital data boot blocks with a predetermined pattern of data which, when played backed, is digital silence.

10. The method defined by claim 9 wherein said predetermined pattern of data is obtained by applying an exclusive OR operation involving each byte or each CD-ROM sector and an output of a scramble register and using the result to replace certain data in said CD-ROM sectors.

11. The method defined by claim 3 further comprising the step of replacing user data sectors within said CD-ROM digital data boot blocks with a predetermined pattern of data which, when played backed, is digital silence.

12. The method defined by claim 11 wherein said predetermined pattern of data is obtained by applying an exclusive OR operation involving each byte or each CD-ROM sector and an output of a scramble register and using the result to replace certain data in said CD-ROM sectors.

13. The method defined by claim 4 further comprising the step of replacing user data sectors within said CD-ROM digital data boot blocks with a predetermined pattern of data which, when played backed, is digital silence.

14. The method defined by claim 13 wherein said predetermined pattern of data is obtained by applying an exclusive OR operation involving each byte or each CD-ROM sector and an output of a scramble register and using the result to replace certain data in said CD-ROM sectors.

15. The method defined by claim 5 further comprising the step of replacing user data sectors within said CD-ROM digital data boot blocks with a predetermined pattern of data which, when played backed, is digital silence.

16. The method defined by claim 15 wherein said predetermined pattern of data is obtained by applying an exclusive OR operation involving each byte or each CD-ROM sector and an output of a scramble register and using the result to replace certain data in said CD-ROM sectors.

17. The method defined by claim 6 further comprising the step of replacing user data sectors within said CD-ROM digital data boot blocks with a predetermined pattern of data which, when played backed, is digital silence.

18. The method defined by claim 17 wherein said predetermined pattern of data is obtained by applying an exclusive OR operation involving each byte or each CD-ROM sector and an output of a scramble register and using the result to replace certain data in said CD-ROM sectors.

* * * * *